(12) United States Patent
Malkes et al.

(10) Patent No.: US 10,935,388 B2
(45) Date of Patent: Mar. 2, 2021

(54) ADAPTIVE OPTIMIZATION OF NAVIGATIONAL ROUTES USING TRAFFIC DATA

(71) Applicant: Cubic Corporation, San Diego, CA (US)

(72) Inventors: William A. Malkes, Knoxville, TN (US); William S. Overstreet, Knoxville, TN (US); Jeffery R. Price, Knoxville, TN (US); Michael J. Tourville, Lenoir City, TN (US)

(73) Assignee: Cubic Corporation, San Diego, CA (US)

( * ) Notice: Subject to any disclaimer, the term of this patent is extended or adjusted under 35 U.S.C. 154(b) by 72 days.

(21) Appl. No.: 16/101,933

(22) Filed: Aug. 13, 2018

(65) Prior Publication Data

US 2019/0049264 A1 Feb. 14, 2019

Related U.S. Application Data

(60) Provisional application No. 62/545,295, filed on Aug. 14, 2017.

(51) Int. Cl.
*G01C 21/34* (2006.01)
*G08G 1/07* (2006.01)
(Continued)

(52) U.S. Cl.
CPC ..... *G01C 21/3492* (2013.01); *G01C 21/3484* (2013.01); *G08G 1/0116* (2013.01);
(Continued)

(58) Field of Classification Search
USPC ........................................................ 701/414
See application file for complete search history.

(56) References Cited

U.S. PATENT DOCUMENTS

| 4,833,469 A | 5/1989 | David |
| 5,111,401 A | 5/1992 | Everette et al. |

(Continued)

FOREIGN PATENT DOCUMENTS

| CN | 100533151 | 8/2009 |
| CN | 101799987 | 8/2010 |

(Continued)

OTHER PUBLICATIONS

Google patents machine translation of KR20150138735A.*

(Continued)

*Primary Examiner* — Jean Paul Cass
(74) *Attorney, Agent, or Firm* — Kilpatrick Townsend & Stockton, LLP

(57) ABSTRACT

A traffic control system and a method for optimizing navigational routing based on per-intersection real-time traffic conditions data. One aspect is a method of providing navigational guidance. The method includes identifying at least one intersection along at least one initial route to a destination; modifying the at least one initial route based on user preferences and traffic conditions data associated with the at least one intersection to yield at least one modified route; receiving a selection of a route from among the at least one modified route; receiving updated traffic conditions data for at least one corresponding intersection along the route selected; and modifying the route selected based on the updated traffic conditions data.

19 Claims, 10 Drawing Sheets

(51) Int. Cl.
*G08G 1/0968* (2006.01)
*G08G 1/01* (2006.01)

(52) U.S. Cl.
CPC ............ *G08G 1/0141* (2013.01); *G08G 1/07* (2013.01); *G08G 1/096811* (2013.01); *G08G 1/096838* (2013.01); *G08G 1/096844* (2013.01)

(56) References Cited

U.S. PATENT DOCUMENTS

| | | |
|---|---|---|
| 5,208,584 A | 5/1993 | Kaye et al. |
| 5,406,490 A | 4/1995 | Braegas |
| 5,444,442 A | 8/1995 | Sadakata et al. |
| 6,064,139 A | 5/2000 | Ozawa et al. |
| 6,075,874 A | 6/2000 | Higashikubo et al. |
| 6,317,058 B1 | 11/2001 | Lemelson et al. |
| 6,366,219 B1 | 4/2002 | Hoummady |
| 6,405,132 B1 | 6/2002 | Breed et al. |
| 6,505,046 B1 | 1/2003 | Baker |
| 6,526,352 B1 | 2/2003 | Breed et al. |
| 6,720,920 B2 | 4/2004 | Breed et al. |
| 6,741,926 B1 | 5/2004 | Zhao et al. |
| 6,751,552 B1 | 6/2004 | Minelli |
| 6,768,944 B2 | 7/2004 | Breed et al. |
| 6,862,524 B1 | 3/2005 | Nagda et al. |
| 6,937,161 B2 | 8/2005 | Nishimura |
| 7,110,880 B2 | 9/2006 | Breed et al. |
| 7,610,146 B2 | 10/2009 | Breed |
| 7,630,806 B2 | 12/2009 | Breed |
| 7,698,055 B2 | 4/2010 | Horvitz et al. |
| 7,698,062 B1 | 4/2010 | McMullen et al. |
| 7,821,421 B2 | 10/2010 | Tamir et al. |
| 7,835,859 B2 | 11/2010 | Bill |
| 7,899,611 B2 | 3/2011 | Downs et al. |
| 7,979,172 B2 | 7/2011 | Breed |
| 8,050,863 B2 | 11/2011 | Trepagnier et al. |
| 8,135,505 B2 | 3/2012 | Vengroff et al. |
| 8,144,947 B2 | 3/2012 | Kletter |
| 8,212,688 B2 | 7/2012 | Morioka et al. |
| 8,255,144 B2 | 8/2012 | Breed et al. |
| 8,373,582 B2 | 2/2013 | Hoffberg |
| 8,566,029 B1 | 10/2013 | Lopatenko et al. |
| 8,589,069 B1 | 11/2013 | Lehman |
| 8,682,812 B1 | 3/2014 | Ran |
| 8,706,394 B2 | 4/2014 | Trepagnier et al. |
| 8,825,350 B1 | 9/2014 | Robinson |
| 8,903,128 B2 | 12/2014 | Shet et al. |
| 9,043,143 B2 | 5/2015 | Han |
| 9,387,928 B1 | 7/2016 | Gentry et al. |
| 9,965,951 B1 | 5/2018 | Gallagher et al. |
| 2004/0155811 A1 | 8/2004 | Albero et al. |
| 2005/0187708 A1 | 8/2005 | Joe et al. |
| 2007/0162372 A1 | 7/2007 | Anas |
| 2007/0208494 A1 | 9/2007 | Chapman et al. |
| 2007/0273552 A1 | 11/2007 | Tischer |
| 2007/0299599 A1* | 12/2007 | Letchner ............ G01C 21/3484 701/424 |
| 2008/0094250 A1 | 4/2008 | Myr |
| 2008/0195257 A1 | 8/2008 | Rauch |
| 2009/0048750 A1 | 2/2009 | Breed |
| 2009/0051568 A1 | 2/2009 | Corry et al. |
| 2009/0287401 A1* | 11/2009 | Levine ................ G08G 1/0141 701/117 |
| 2011/0037618 A1 | 2/2011 | Ginsberg et al. |
| 2011/0205086 A1 | 8/2011 | Lamprecht et al. |
| 2012/0038490 A1 | 2/2012 | Verfuerth |
| 2012/0112928 A1 | 5/2012 | Nishimura et al. |
| 2014/0136414 A1 | 5/2014 | Abhyanker |
| 2014/0210645 A1* | 7/2014 | Sharma .................... G08G 1/07 340/907 |
| 2014/0277986 A1 | 9/2014 | Mahler et al. |
| 2014/0350830 A1* | 11/2014 | David ................. G08G 1/0145 701/117 |
| 2017/0169309 A1 | 6/2017 | Reddy et al. |
| 2017/0292848 A1* | 10/2017 | Nepomuceno ..... G01C 21/3492 |
| 2018/0075739 A1 | 3/2018 | Ginsberg et al. |
| 2018/0096595 A1* | 4/2018 | Janzen ................ G06K 9/0063 |
| 2019/0050647 A1 | 2/2019 | Malkes |
| 2019/0051152 A1 | 2/2019 | Malkes |
| 2019/0051160 A1 | 2/2019 | Malkes |
| 2019/0051161 A1 | 2/2019 | Malkes |
| 2019/0051162 A1 | 2/2019 | Malkes |
| 2019/0051163 A1 | 2/2019 | Malkes |
| 2019/0051164 A1 | 2/2019 | Malkes |
| 2019/0051167 A1 | 2/2019 | Malkes |
| 2019/0051171 A1 | 2/2019 | Malkes |

FOREIGN PATENT DOCUMENTS

| | | | |
|---|---|---|---|
| CN | 101944295 | | 1/2011 |
| CN | 103797527 A | * | 9/2011 |
| CN | 103797527 A | * | 5/2014 ......... G01C 21/3492 |
| EP | 0 464 821 | | 1/1992 |
| KR | 2013-0067847 | | 6/2013 |

OTHER PUBLICATIONS

Google patents machine translation of WO2015077767A1.*
U.S. Appl. No. 16/030,396 Office Action dated Nov. 20, 2018.
U.S. Appl. No. 16/058,343 Office Action dated Nov. 19, 2018.
Dehghan et al., Afshin; "Automatic Detection and Tracking of Pedestrians in Videos with Various Crowd Densities", Pedestrian and Evacuation Dynamics 2012.
Dubska et al.; "Automatic Camera Calibration for Traffic Understanding", bmva.org, 2014.
Grosser, Kari; "Smart Io T Technologies for Adaptive Traffic Management Using a Wireless Mes Sensor Network", Advantech Industrial Io T Blog, Feb. 3, 2017.
https://www.flir.com, 2018.
Halper, Mark; Smart Cameras Will Help Spokane Light It's World More Intelligently (Updated), LEDs Magazine, and Business/Energy/Technology Journalist, Apr. 19, 2017.
Heaton, Brian; "Smart Traffic Signals Get a Green Light", Government Technology Magazine, Feb. 15, 2012.
Kolodny, Lora; Luminar reveals sensors that could make self-driving cars safer than human, Techcrunch, Apr. 13, 2017.
McDermott, John; "Google's newest secret weaon for local ads", Digiday, Jan. 29, 2014.
Resnick, Jim; "How Smart Traffic Signals May Ease Your Commute", BBC, Autos, Mar. 18, 2015.
Sun et al., M.; "Relating Things and Stuff Via Object Property Interactions", cvgl.stanford.edu, Sep. 4, 2012.
Whitwam, Ryan; "How Google's self-driving cars detect and avoid obstacles", ExtremeTech, Sep. 8, 2014.
Yamaguchi, Jun'ichi; "Three Dimensional Measurement Using Fisheye Stereo Vision", Advances in Theory and Applications of Stereo Vision, Dr. Asim Bhatti (Ed.), ISBN:978-953-307-516-7, InTech. Jan. 8, 2011.
U.S. Appl. No. 16/030,396, William A. Malkes, System and Method Adaptive Controlling of Traffic Using Camera Data, filed Jul. 9, 2018.
U.S. Appl. No. 16/044,891, William A. Malkes, System and Method for Controlling Vehicular Traffic, filed Jul. 25, 2018.
U.S. Appl. No. 16/032,886, William A. Malkes, Adaptive Traffic Control Using Object Tracking and Identity Details, filed Jul. 11, 2018.
U.S. Appl. No. 16/058,106, William A. Malkes, System and Method for Managing Traffic by Providing Recommendations to Connected Objects, filed Aug. 8, 2018.
U.S. Appl. No. 16/059,814, William A. Malkes, Systems and Methods of Navigating Vehicles, filed Aug. 9, 2018.
U.S. Appl. No. 16/059,886, William A. Malkes, System and Method of Adaptive Traffic Optimization Using Unmanned Aerial Vehicles, filed Aug. 9, 2018.
U.S. Appl. No. 16/058,214, William A. Malkes, System and Method of Adaptive Traffic Management at an Intersection, filed Aug. 8, 2018.

(56) References Cited

OTHER PUBLICATIONS

U.S. Appl. No. 16/100,750, William A. Malkes, System and Method of Adaptive Traffic Management at an Intersection, filed Aug. 10, 2018.
U.S. Appl. No. 16/101,766, William A. Malkes, System and Method for Retail Revenue Based Traffic Management, filed Aug. 13, 2018.
U.S. Appl. No. 16/058,343, William A. Malkes, System and Method of Adaptive Controlling of Traffic Using Zone Based Occupancy, filed Aug. 8, 2018.

\* cited by examiner

Figure 6

| User preference List | User Question |
|---|---|
| Avoid Dense Pedestrian Areas | Would you prefer to avoid heavy pedestrian intersections? |
| Avoid sitting in traffic | Would you prefer to avoid sitting in traffic or long lights? |
| More greenlights | Would you prefer to shorter greenlights or timed lights? |
| Fewer Left turns | Would you prefer to avoid left turns where possible? |
| Avoid long left turn yield times | Would you prefer to avoid left turns with high yield times? |

810

| User ID | Avoid Dense Pedestrian Areas | Avoid sitting in traffic | More greenlights | Fewer Left turns | ... | Avoid long left turn yield times |
|---|---|---|---|---|---|---|
| 1 | X | X |   | X |   | X |
| 2 |   | X | X | X |   | X |
| 3 | X | X |   | X |   |   |
| 4 | X | X | X | X |   | X |
| 5 | X |   | X | X |   | X |
| 6 |   | X | X | X |   | X |
| 7 | X | X |   | X |   |   |
| ... |   |   |   |   |   |   |
| 11 | X | X | X | X |   |   |
| 12 | X | X | X |   |   |   |
| N | X | X | X | X |   | X |

ADAPTIVE OPTIMIZATION OF NAVIGATIONAL ROUTES USING TRAFFIC DATA

CROSS-REFERENCE TO RELATED APPLICATIONS

This application claims priority to U.S. Provisional Patent Application No. 62/545,295 filed on Aug. 14, 2017, the entire content of which is incorporated herein by reference.

FIELD OF THE DISCLOSURE

The present disclosure is generally related to vehicular navigation systems, and more particularly related to optimization of navigational routes using intersection specific traffic conditions data.

BACKGROUND

Ever increasing traffic is a serious problem especially in urban areas as travel times are considerably increased due to increased traffic. A better utilization of existing infrastructure appears to be more attractive and this becomes increasingly possible due to huge developments in the world of Information and Communication Technology (ICT). However, implementing ICT solutions for the purpose of traffic management by implementing a communication network between infrastructures, vehicles, and drivers simultaneously can be challenging. Gathering relevant traffic information and a user travel information in a way that can enhance traffic optimization can be quite difficult.

There has been some advancement by including mobile devices, like smart phones, navigation systems, and roadside devices, like loop detectors and cameras into traffic optimization systems. The current navigation systems can provide route selection on the basis of fuel economy, travel time, and congestions. However, consideration of travel time intervals, traffic flow rates, pedestrian count, vehicle types, time delays due to stop signals, and various other parameters to provide drivers with real-time data to help in choosing a route is still lacked in current navigational systems.

Thus, there is a need to provide drivers with real time choices based on user preferences to determine best possible navigation route.

SUMMARY

One aspect of the present disclosure is a method of providing navigation guidance. The method includes identifying at least one intersection along at least one initial route to a destination; modifying the at least one initial route based on user preferences and traffic conditions data associated with the at least one intersection to yield at least one modified route; receiving a selection of a route from among the at least one modified route; receiving updated traffic conditions data for at least one corresponding intersection along the route selected; and modifying the route selected based on the updated traffic conditions data.

One aspect of the present disclosure is a device for providing navigation guidance. The device includes memory having computer-readable instructions stored thereon and one or more processors. The one or more processors are configured to execute the computer-readable instructions to identify at least one intersection along at least one initial route to a destination; modify the at least one initial route based on user preferences and traffic conditions data associated with the at least one intersection to yield at least one modified route; receive a selection of a route from among the at least one modified route; receive updated traffic conditions data for at least one corresponding intersection along the route selected; and modify the route selected based on the updated traffic conditions data.

One aspect of the present disclosure includes one or more non-transitory computer-readable medium having computer-readable instructions stored thereon, which when executed by one or more processors, cause the one or more processors to identify at least one intersection along at least one initial route to a destination; modify the at least one initial route based on user preferences and traffic conditions data associated with the at least one intersection to yield at least one modified route; receive a selection of a route from among the at least one modified route; receive updated traffic conditions data for at least one corresponding intersection along the route selected; and modify the route selected based on the updated traffic conditions data.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 6 illustrates an example of traffic conditions data stored for multiple intersections;

FIG. 8 illustrates an example of data stored in a user preference database;

DETAILED DESCRIPTION

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures and techniques may be shown without unnecessary detail in order to avoid obscuring embodiments.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Example embodiments of the present disclosure will be described more fully hereinafter with reference to the accompanying drawings in which like numerals represent like elements throughout the several figures, and in which example embodiments are shown. Example embodiments of the claims may, however, be embodied in many different forms and should not be construed as limited to the example embodiments set forth herein. The examples set forth herein are non-limiting examples and are merely examples among other possible examples.

As noted above, current parameters used by navigational systems to provide users with optimal travel routes to a desired destination include fuel economy, travel time, and congestions. However, consideration of per-intersection parameters such as traffic flow rates, pedestrian count, vehicle types, time delays due to stop signals, and various other parameters (that may vary from one intersection to the next) are lacking from the process employed by such navigational tools to determine navigational routes, and thus deprive drivers of more accurate and real-time navigational assistance.

Throughout the present disclosure, examples and concepts will be described for incorporating and taking into consideration real-time traffic conditions at each individual intersection that may coincide with possible routes to a destination and determine an optimal based partly on such real-time per-intersection traffic conditions.

The disclosure being with example systems and methods for collecting data and determining per-intersection traffic condition data followed by example systems and methods of using per-intersection traffic condition data to determine optimal navigational routes.

Figure 1:
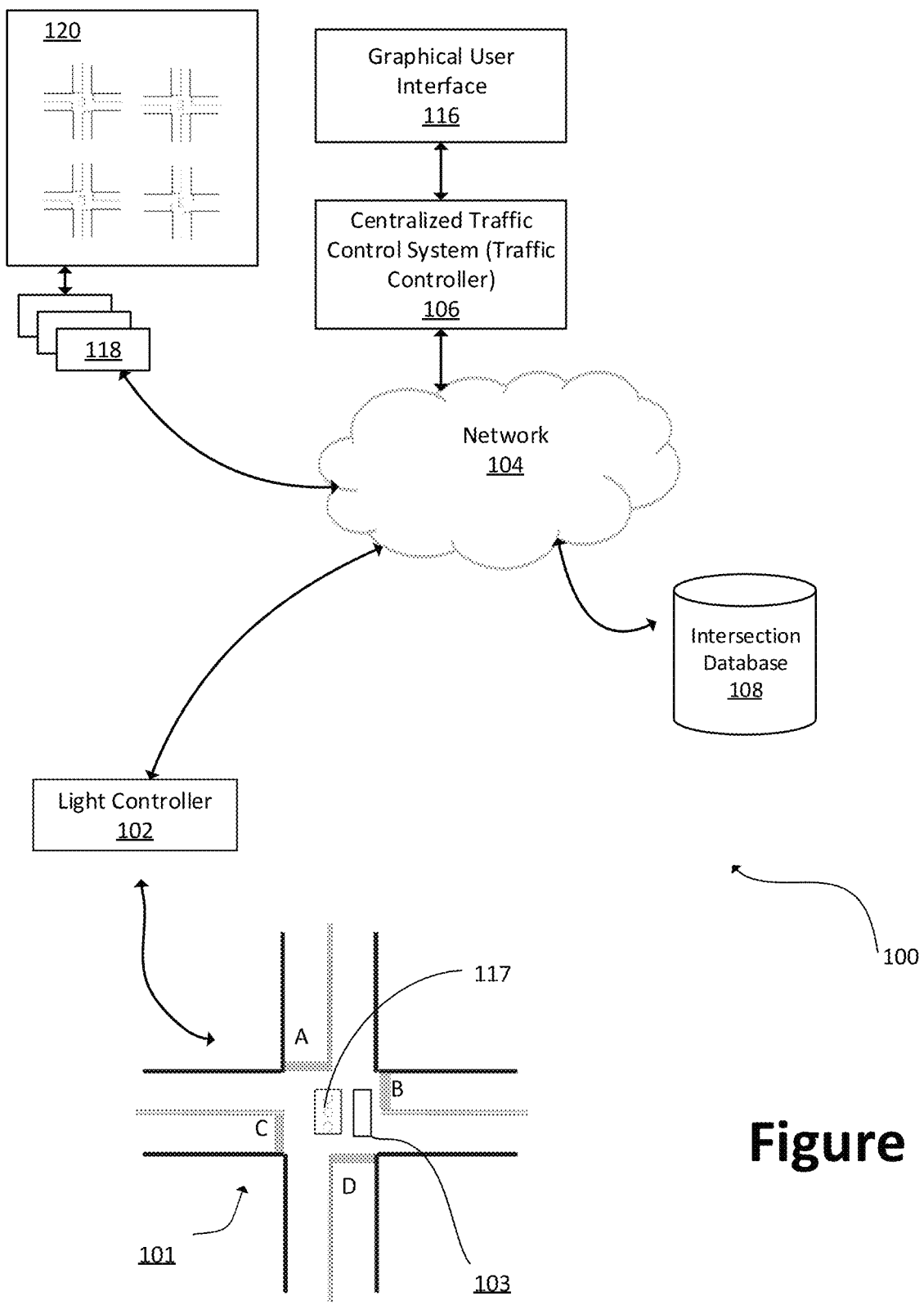
FIG. 1 illustrates a system for controlling traffic.

FIG. 1 illustrates a system for controlling traffic. The system 100 can comprise various components including but not limited to, a traffic light controller 102 (hereinafter may be referred to as a light controller 102) associated with a smart traffic camera 103 and a traffic light 117 installed at an intersection 101. The light controller 102 may be configured to receive traffic control rules from a traffic controller 106 and control the traffic light 117 to implement the same. The light controller 102 may or may not be physically located near (or at the same location as) the smart traffic camera 103 and/or the traffic light 117. The light controller 102, the smart traffic camera 103 and/or the traffic light 117 may be the same physical unit implementing functionalities of both. There may be more than one smart traffic camera 103 and/or traffic light 117 installed at the intersection 101.

In one example embodiment, the traffic light 117 associated with the light controller 102 can have different traffic signals directed towards all the roads/zones leading to the intersection 101. The different signals may comprise a Red light, a Yellow light, and a Green light.

The smart traffic camera 103 may be one of various types of cameras, including but not limited, to fisheye traffic cameras to detect and optimize traffic flows at the intersection 101 and/or at other intersection apart of the same local network or corridor. The smart traffic camera 103 can include any combination of cameras or optical sensors, such as but not limited to fish-eye cameras, directional cameras, infrared cameras, etc. The smart traffic camera 103 can allow for other types of sensors (e.g., audio sensors, temperature sensors, etc.) to be connected thereto (e.g., via various known or to be developed wired and/or wireless communication schemes) for additional data collection. The smart traffic camera 103 can collect video and other sensor data at the intersection 101 and convey the same to the light controller 102 for further processing, as will be described below.

The smart traffic camera 103 and/or the traffic light 117 can be used to manage and control traffic for all zones (directions) at which traffic enters and exits the intersection 101. Examples of different zones of the intersection 101 are illustrated in FIG. 1 (e.g., zones A, B, C and D). Therefore, while FIG. 1 only depicts a single smart traffic camera 103 and a single traffic light 117, there can be multiple ones of the smart traffic camera 103 and/or multiple ones of traffic lights 117 installed at the intersection 101 for managing traffic for different zones of the intersection 101.

The system 100 may further include network 104. The network 104 can enable the light controller 102 to communicate with the traffic controller 106 (a remote traffic control system 106). The network 104 can be any known or to be developed cellular, wireless access network and/or a local area network that enables communication (wired or wireless) among components of the system 100. The light controller 102 and the traffic controller 106 can communicate via the network 104 to exchange data, created traffic rules or control settings, etc., as will be described below.

The remote traffic control system 106 can be a centralized system used for managing and controlling traffic lights and conditions at multiple intersections (in a given locality, neighborhood, an entire town, city, state, etc.). The remote traffic control system 106 can also be referred to as the centralized traffic control system 106, the traffic control system 106 or simply the traffic controller 106, all of which can be used interchangeably throughout the present disclosure.

The traffic controller 106 can be communicatively coupled (e.g., via any known or to be developed wired and/or wireless network connection such as network 104) to one or more databases. One such database is an intersection database 108 used to store traffic flow rates and various statistics about the traffic conditions at the intersection 101 based on analysis of images and data received from the smart traffic camera 103 (and/or traffic sensor(s) 306, which will be discussed below with reference to FIG. 3). In one example, database 108 may be associated with the traffic controller 106 and may be co-located with and co-operated with traffic controller 106. Alternatively, the databases 108 may be remotely located relative the traffic controller 106 and accessible via the network 104 as shown in FIG. 1.

Referring back to the traffic controller 106, the traffic controller 106 can provide a centralized platform for network operators to view and manage traffic conditions, set traffic control parameters and/or manually override any traffic control mechanisms at any given intersection. An operator can access and use the traffic controller 106 via a corresponding graphical user interface 116 after providing login credentials and authentication of the same by the traffic controller 106. The traffic controller 106 can be controlled, via the graphical user interface 116, by an operator to receive traffic control settings and parameters to apply to one or more designated intersections. The traffic controller 106 can also perform automated and adaptive control of traffic at the intersection 101 or any other associated intersection based on analysis of traffic conditions, data and statistics at a given intersection(s) using various algorithms and computer-readable programs such as known or to be developed machine learning algorithms. The components and operations of traffic controller 106 will be further described below.

Traffic controller 106 can be a cloud based component running on a public, private and/or a hybrid cloud service provided by one or more cloud service providers.

The system 100 can also have additional intersections and corresponding light controllers associated therewith. Accordingly, not only the traffic controller 106 is capable of adaptively controlling the traffic at an intersection based on traffic data at that particular intersection but it can further adapt traffic control parameters for that particular intersection based on traffic data and statistics at nearby intersections communicatively coupled to the traffic controller 106.

As shown in FIG. 1, the light controllers 118 can be associated with one or more traffic lights at one or more of the intersections 120 and can function in a similar manner as the light controller 102 and receive traffic control settings from the traffic controller 106 for managing traffic at the corresponding one of intersections 120. Alternatively, any one of the light controllers 118 can be a conventional light controller implementing pre-set traffic control settings at the corresponding traffic lights but configured to convey corresponding traffic statistics to the traffic controller 106.

The traffic database 108 can store per-intersection traffic condition data for all the intersections (the intersection 101 and the intersections 120) to which the traffic controller 106 is communicatively coupled (via an associated light controller for example).

The intersections 120 can be any number of intersections adjacent to the intersection 101, within the same neighborhood or city as the intersection 101, intersections in another city, etc.

In one or more examples, the light controller 102 and the traffic controller 106 can be the same (one component implementing the functionalities of both). In such example, components of each described below with reference to FIGS. 2 and 3 may be combined into one. Furthermore, in such example, the light controller 102 may be remotely located relative to the smart traffic camera 103 and/or the traffic light 117 and be communicatively coupled thereto over a communication network such as the network 104.

As mentioned above, the components of the system 100 can communicate with one another using any known or to be developed wired and/or wireless network. For example, for wireless communication, techniques such as Visible Light Communication (VLC), Worldwide Interoperability for Microwave Access (WiMAX), Long Term Evolution (LTE), Fifth Generation (5G) Cellular, Wireless Local Area Network (WLAN), Infrared (IR) communication, Public Switched Telephone Network (PSTN), Radio waves, and other communication techniques known or to be developed in the art may be utilized.

While certain components of the system 100 are illustrated in FIG. 1, the present disclosure is not limited thereto and the system 100 may include any number of additional components necessary for operation and functionality thereof.

Figure 2:
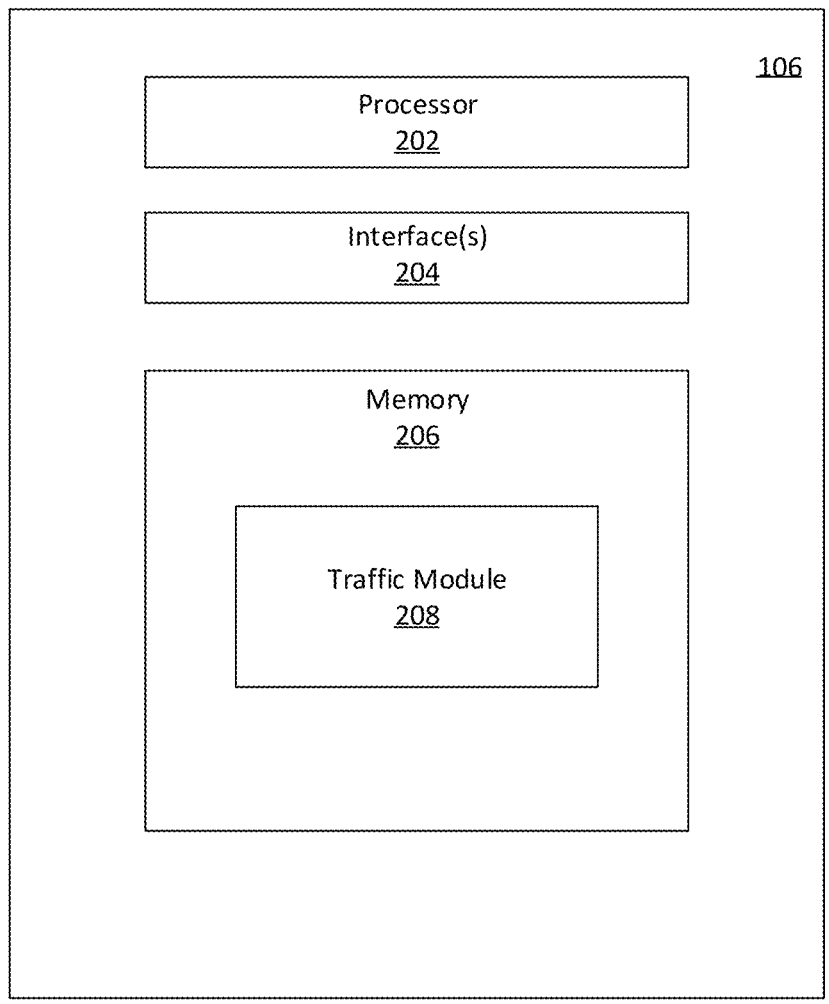
FIG. 2 is a block diagram showing different components of the traffic controller of FIG. 1.

FIG. 2 is a block diagram showing different components of the traffic controller of FIG. 1.

The traffic controller 106 can comprise one or more processors such as a processor 202, interface(s) 204 and one or more memories such as a memory 206. The processor 202 may execute an algorithm stored in the memory 206 for managing traffic at intersections by providing recommendations and incentives to objects at the intersection to take alternative routes to their respective destinations. The processor 202 may also be configured to decode and execute any instructions received from one or more other electronic devices or server(s). The processor 202 may include one or more general purpose processors (e.g., INTEL® or Advanced Micro Devices® (AMD) microprocessors, ARM) and/or one or more special purpose processors (e.g., digital signal processors, Xilinx® System On Chip (SOC) Field Programmable Gate Array (FPGA) processor, and/or Graphics Processing Units (GPUs)). The processor 202 may be configured to execute one or more computer-readable program instructions, such as program instructions to carry out any of the functions described in this description.

The interface(s) 204 may assist an operator in interacting with the traffic controller 106. The interface(s) 204 of the traffic controller 106 can be used instead of or in addition to the graphical user interface 116 described above with reference to FIG. 1. In another example, the interface(s) 204 can be the same as the graphical user interface 116. The interface(s) 204 either accept an input from the operator or provide an output to the operator, or may perform both the actions. The interface(s) 204 may either be a Command Line Interface (CLI), Graphical User Interface (GUI), voice interface, and/or any other user interface known in the art or to be developed.

The memory 206 may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

The memory 206 may include computer-readable instructions, which when executed by the processor 202 cause the traffic controller 106 to manage traffic in relation to nearby retail revenues at the intersection 101. The computer-readable instructions stored in the memory 206 can be identified as traffic module (service) 208, the functionalities of which, when executed by the processor 202 will be further described below.

Figure 3:
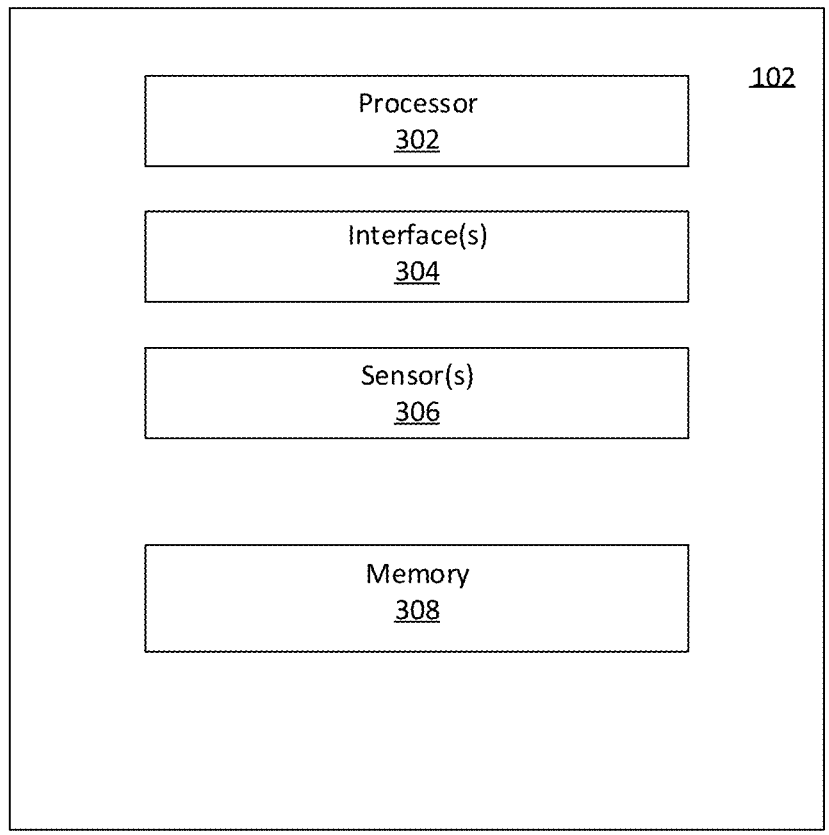
FIG. 3 is a block diagram showing different components of the light controller of FIG. 1.

FIG. 3 is a block diagram showing different components of the light controller of FIG. 1. As mentioned above, the light controller 102 can be physically located near the smart traffic camera 103 and/or the traffic light 117 (e.g., at a corner of the intersection 101) or alternatively can communicate with the smart traffic camera 103 and/or the traffic light 117 wirelessly or via a wired communication scheme (be communicatively coupled thereto).

The light controller 102 can comprise one or more processors such as a processor 302, interface(s) 304, sensor(s) 306, and one or more memories such as a memory 308. The processor 302 may execute an algorithm stored in the memory 308 for implementing traffic control rules, as provided by traffic controller 106. The processor 302 may also be configured to decode and execute any instructions received from one or more other electronic devices or server(s). The processor 302 may include one or more general purpose processors (e.g., INTEL® or Advanced Micro Devices® (AMD) microprocessors, ARM) and/or one or more special purpose processors (e.g., digital signal processors, Xilinx® System On Chip (SOC) Field Programmable Gate Array (FPGA) processor, and/or Graphics Processing Units (GPUs)). The processor 302 may be configured to execute one or more computer-readable program instructions, such as program instructions to carry out any of the functions described in this description.

The interface(s) 304 may assist an operator in interacting with the light controller 102. The interface(s) 304 of the light controller 102 may be used instead of or in addition to the graphical user interface 116 described with reference to FIG. 1. In one example, the interface(s) 304 can be the same as the graphical user interface 116. The interface(s) 304 either accept an input from the operator or provide an output to the operator, or may perform both actions. The interface(s) 304 may either be a Command Line Interface (CLI), Graphical User Interface (GUI), and/or any other user interface known in the art or to be developed.

The sensor(s) 306 can be one or more smart cameras such as fish-eye cameras mentioned above or any other type of sensor/capturing device that can capture various types of data (e.g., audio/visual data) regarding activities and traffic patterns at the intersection 101. Any one such sensor 306 can be located at/attached to the light controller 102, located at/attached to the smart traffic camera 103 and/or the traffic light 117 or remotely installed and communicatively coupled to the light controller 102 and/or the smart traffic camera 103 via the network 104.

As mentioned, the sensor(s) 306 may be installed to capture objects moving across the roads. The sensor(s) 306 used may include, but are not limited to, optical sensors such as fish-eye camera mentioned above, Closed Circuit Television (CCTV) camera and Infrared camera. Further, sensor (s) 306 can include, but not limited to induction loops, Light Detection and Ranging (LIDAR), radar/microwave, weather sensors, motion sensors, audio sensors, pneumatic road tubes, magnetic sensors, piezoelectric cable, and weigh-in motion sensor, which may also be used in combination with the optical sensor(s) or alone.

The memory 308 may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

The memory 308 may include computer-readable instructions, which when executed by the processor 302 cause the light controller 102 to implement traffic control rules as provided by traffic controller 106.

As mentioned above, light controller 102 and traffic controller 106 may form a single physical unit, in which case system components of each, as described with reference to FIGS. 1 to 3 may be combined into one (e.g., all example modules described above with reference to FIGS. 2 and 3 may be stored on a single memory such as the memory 206 or the memory 308).

While certain components have been shown and described with reference to FIGS. 2 and 3, the components of the light controller 102 and/or the traffic controller 106 are not limited thereto, and can include any other component for proper operations thereof including, but not limited to, a transceiver, a power source, etc.

Figure 4:
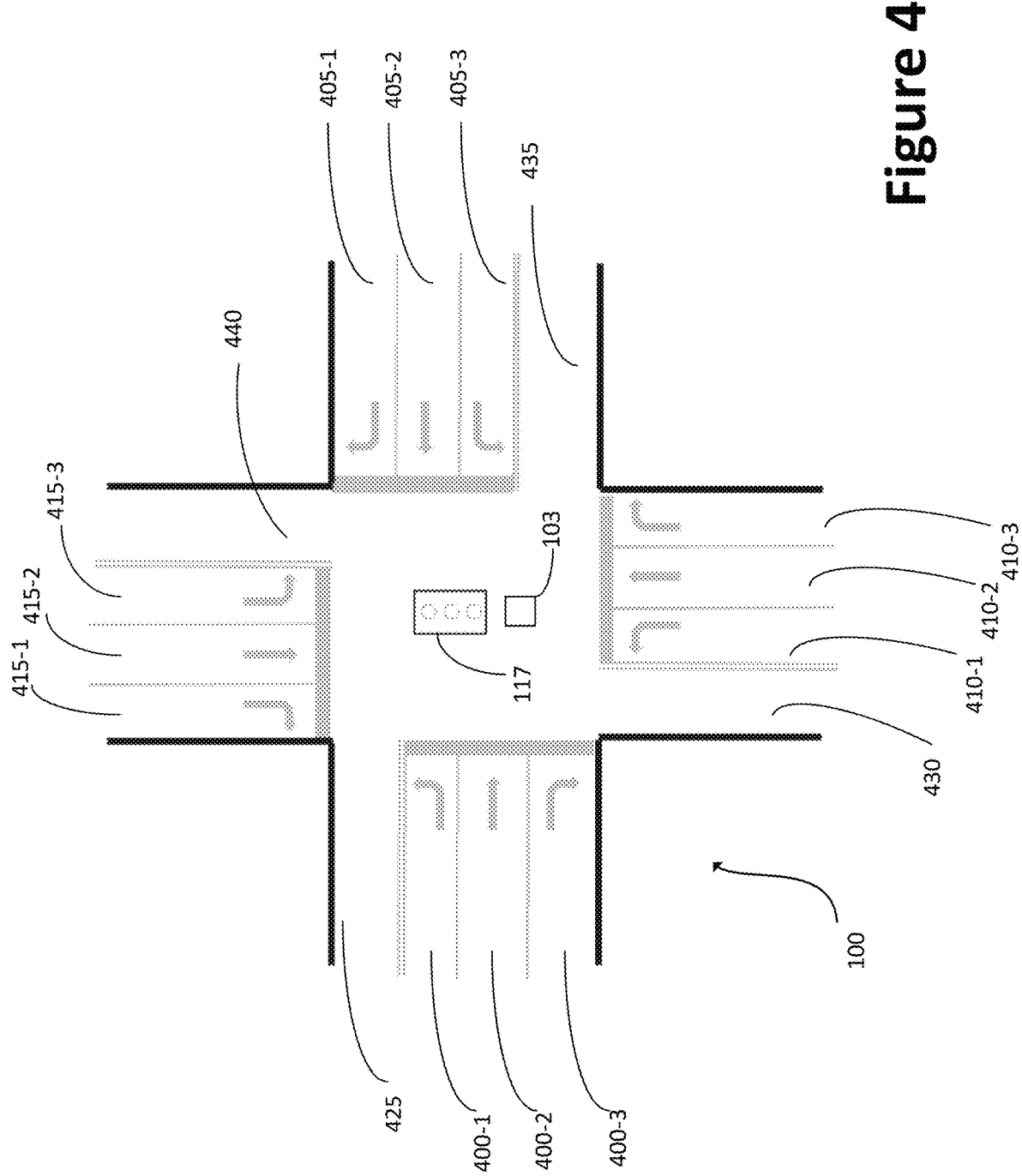
FIG. 4 illustrates an example of an intersection.

FIG. 4 illustrates an example of an intersection. As shown in FIG. 4, the intersection 101 has four entrance zones (zones 400-1 to 400-3, zones 405-1 to 405-3, zones 410-1 to 410-3 and zones 415-1 to 415-3), the traffic light 117 and the smart traffic camera 103. The intersection 101 of FIG. 4 also includes the light controller 102 of FIG. 1 (not shown in FIG. 4). FIG. 4 also includes an example exit zone in each direction (zones 425, 430, 435 and 440).

Having described an example system and example components of one or more elements thereof with reference to FIGS. 1-3 as well as an example of the intersection 101 in FIG. 4, the disclosure now turns to the description of examples for determining traffic conditions data and parameters at the intersection 101.

Figure 5:
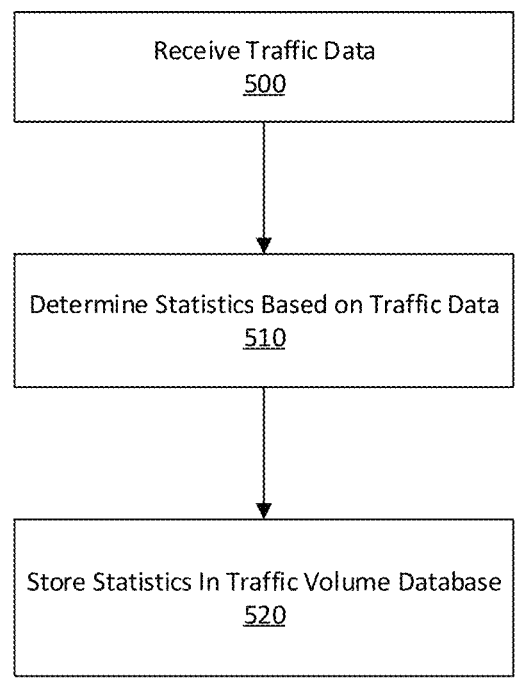
FIG. 5 illustrates a flowchart of a method of determining traffic conditions data at an intersection.

FIG. 5 illustrates a flowchart of a method of determining traffic conditions data at an intersection. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed example embodiments.

Furthermore, FIG. 5 will be described from the perspective of the traffic controller 106. However, it will be understood that the functionalities of the traffic controller 106 are implemented by the processor 202 executing computer-readable instructions stored on the memory 206 described with reference to FIG. 2.

While FIG. 5 will be described with reference to the intersection 101, the process can also be used to collection traffic condition data and parameters for any other intersection (e.g., any one of the intersections 120) using the corresponding light controller 118, corresponding smart traffic camera(s) and sensor(s) similar to the smart traffic camera 103 and sensor(s) 306.

At step 500, the traffic controller 106 may receive traffic data at the intersection 101. The traffic data may be collected by the smart traffic camera 103 and/or sensor(s) 306 of the light controller 102 and communicated over the network 104 to the traffic controller 106. Alternatively and when the traffic controller 106 is located at the intersection 101 (e.g., when the traffic controller 106 and the light controller 102 are the same), the traffic data collected by the smart traffic camera 103 and/or the sensor(s) 306 will be sent to the traffic controller 106 over any know or to be developed communication scheme such as the network 104 or a short range wireless communication protocol or a wired communication medium. The smart traffic camera 103 can perform the detection within the zones 400-1 to 400-3, zones 405-1 to 405-3, zones 410-1 to 410-3, zones 415-1 to 415-3 and/or any one of the zones 325, 430, 435 and 440, using any known or to be developed image/video processing methods (e.g., salient point optical flow, block matching, etc.).

In one example, the objects detected at the intersection 101 can include any type of object present at the intersection including, but not limited to, pedestrians, cars, trucks, motor cycles, bicycles, autonomous transport/moving objects and vehicles. Furthermore, cars, trucks, buses and bikes can further be broken down into sub-categories. For example, cars can be categorized into sedans, vans, SUVs, etc. Trucks can be categorized into light trucks such as pickup trucks, medium trucks such as box trucks or fire trucks, heavy duty trucks such as garbage trucks, crane movers, 18-wheelers, etc.

In one example, traffic data can also include traffic data of other adjacent and/or nearby intersections provided via corresponding smart traffic lights or light controllers such as light controllers 118 of FIG. 1.

At step 510, the traffic controller 106 can determine various traffic conditions data and parameters regarding the traffic data at the intersection 101 received at step 500 by executing computer-readable instructions corresponding to the traffic module 208 stored on the memory 206 of the traffic controller 106. The traffic statistics can be determined for a plurality of time periods (e.g., time intervals of 1 minute, 2 minutes, 30 minutes, etc.). For each time period, the traffic statistics can include per-zone traffic flow rates, per-zone traffic volume (number of cars or objects detected in a zone), average traffic flow rate or volume per each entrance (and/or exit) lane(s) to and from the intersection 101, average traffic flow rate or volume per the entire intersection 101, average time spent by each object in a given zone or parked in the give zone, pedestrian traffic flow rate or volume, speed of objects detected at the intersection 101 (per-zone, average, or for the entire intersection 101), types of vehicles, etc. As noted above, the traffic controller 106 can determine the traffic statistics using known or to be developed image, video and/or data processing methods.

At step 520, the traffic controller 106 can store the traffic condition data in the intersection database 108. The statistics can be stored in a tabular form. For example, a table can be constructed in the intersection database 108 having various entries for a number of time periods over which the traffic data at the intersection 101 is observed and the statistics described above are stored therein. As noted above, the intersection database 108 can have entries for each different intersection.

In one example, the traffic controller 106 performs the process of FIG. 5 continuously and therefore the intersection database 108 is constantly updated with new data on current and real-time traffic conditions and statistics about the intersection 101 and/or any other intersection such as the intersections 120.

The data stored in the intersection database 108 may have an expiration date associated therewith for purposes of efficient use of computer resources for storing the traffic volume data. For example, data stored in the intersection database 108 may be deleted after a threshold amount of time has passed since the initial storage of the same in the traffic volume database 108 (e.g., 1 week, 1 month, 6 months, 1 year, etc.).

Figure 6:
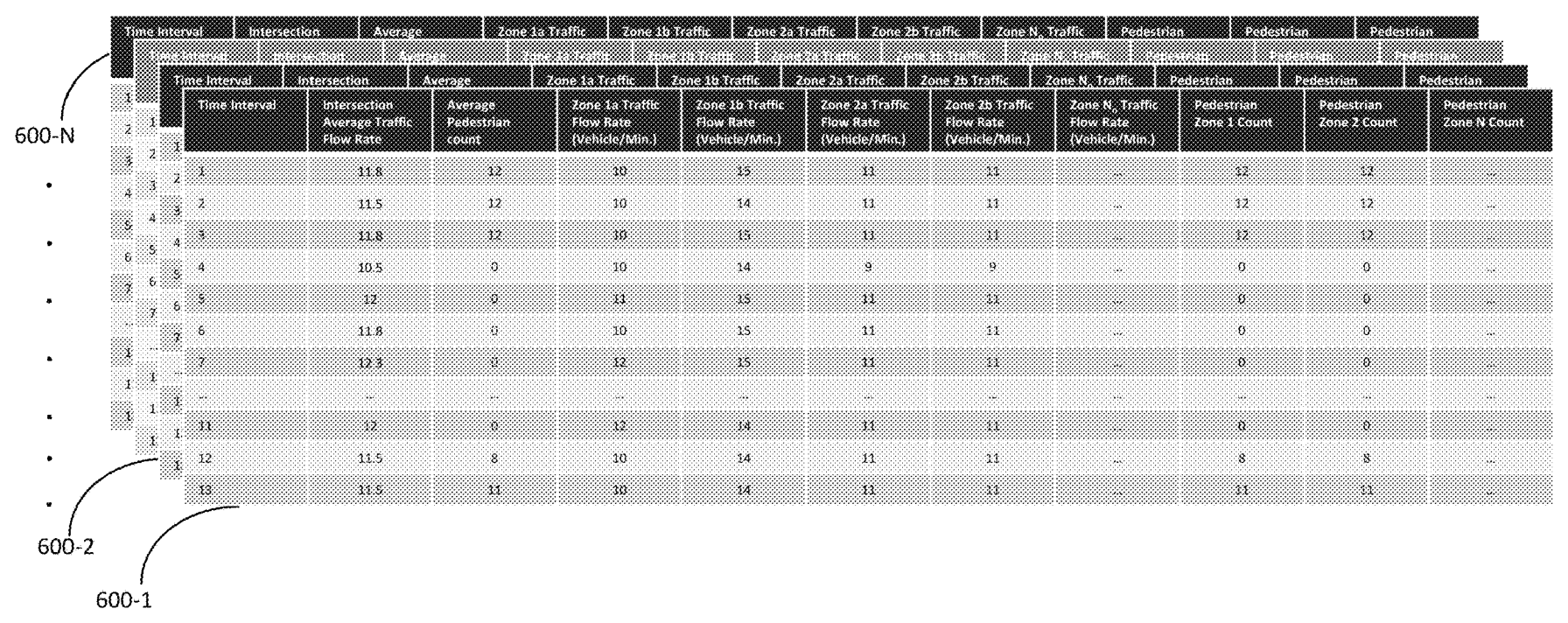

FIG. 6 illustrates an example of traffic conditions data stored for multiple intersections. As can be seen from FIG. 6, the intersection database 108 can include a separate table for each different intersection. For example table 600-1 can be the determined traffic conditions data (real-time and up-to-date traffic conditions data) for the intersection 101 and each of the table 600-2 to 600-N (N is an integer number greater than 2) can be the determined traffic conditions data for a different one of the intersections 120.

As also shown in FIG. 6, each of the tables can include various traffic conditions data for the corresponding intersection collected over multiple time intervals. The duration of the time interval can be a configurable parameter determined based on empirical studies and/or experiments. The various recorded traffic conditions data can include, but are not limited to, average traffic flow rate (e.g., in vehicles/minute or objects/minute) at the corresponding intersection (e.g., the intersection 101) over the corresponding time interval, average pedestrian count at the corresponding intersection (e.g., the intersection 101) over the corresponding time interval, average per-zone traffic flow rate (e.g., identified as zone 1*a*, zone 1*b*, zone 2*a*, zone 2*b* in FIG. 6, which can corresponding to one of the zones 400-440 of FIG. 4) over the corresponding time period and/or average per-zone traffic flow rate (e.g., identified as zone 1*a*, zone 1*b*, zone 2*a*, zone 2*b* in FIG. 6, which can corresponding to one of the zones 400-440 of FIG. 4) over the corresponding time period. Each table can include other information as well such as duration of the traffic signal for each zone of the corresponding intersection, recent average of each phase of the traffic signal for each zone, for each lane or for the intersection, etc.

Having described example systems and methods for monitoring individual intersections and determining various corresponding traffic conditions in real time, the disclosure now turns to description of systems and methods for using this real-time time per-intersection traffic conditions data to determine optimal navigational routes.

Figure 7:
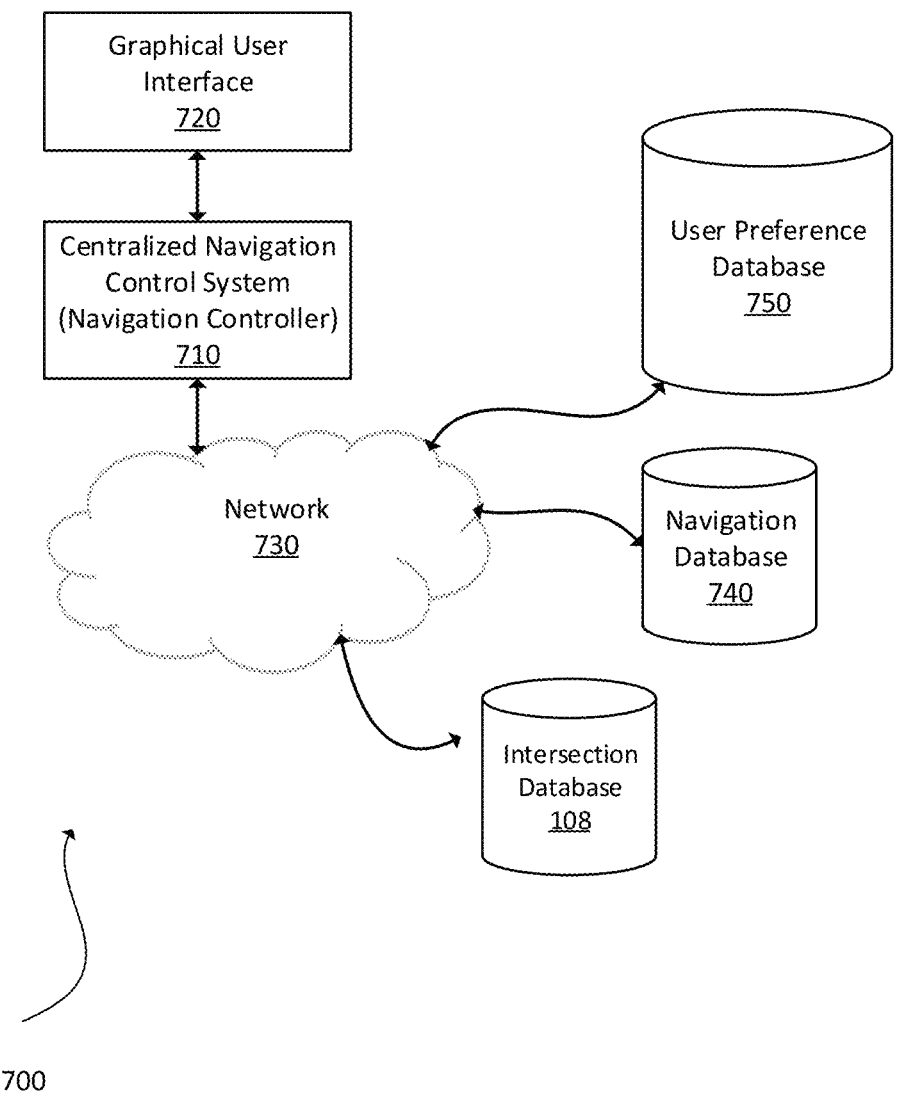
FIG. 7 illustrates an example system for navigational route optimization using per-intersections real-time traffic conditions.

FIG. 7 illustrates an example system for navigational route optimization using per-intersections real-time traffic conditions. The system 700 of FIG. 7 includes a centralized navigation control system (navigation controller) 710 and a corresponding graphical user interface (GUI) 720. The navigation controller 710 can be hosted on a cloud and can be remotely accessible via wired and/or wireless network 730. System components of the navigation controller 710 will be further described below with reference to FIG. 8. Functionalities of the navigation controller 710 for providing navigation guidance will be further described below with reference to FIGS. 9 and 10. The GUI 720 can be used to access the navigation controller 710, by for example a system operator, to manage, update, install software, modify settings and parameters thereof, etc.

System 700 can also include the intersection database 108 described above, a navigation database 740 and a user preference database 750. The navigation database 740 can be a 3$^{rd}$ party provided database including any known or to be developed information that can be used for determining a route to a destination for a user. For example, the navigation database 740 can provide information on road conditions, tracking of mobile devices of other drives or users to determine road congestion parameters (not necessarily at a particular intersection), publicly scheduled events on possible routes to the destination, road closures, weather conditions, etc.

A user may subscribe to the system 700 to use navigational routing services provided by the system 700. Accordingly, the user can access the system 700 via his or her device (e.g., an application installed on a mobile device), enter a destination, provide a current location and request optimal routes to the destination. As part of this request, the user can also provide user preferences or may have a profile that includes modifiable preferences of the user that may be applied to any navigation request by the user. Such user preferences can be stored in the user preference database 750.

Each of the intersection database 108, the navigation database 740 and/or the user preference database 750 can be accessible to the navigation controller 710 and/or the GUI 720 via the network 730.

FIG. 8 illustrates an example of data stored in a user preference database. As shown in FIG. 8, table 800 includes, for each user ID preferences selected by such user. For example, user ID 1's preferences include avoiding dense pedestrian areas, avoiding sitting in traffic, routes with more green lights, fewer left turns, avoiding long left turn yield times, etc. While table 800 includes a number of example preferences, the present disclosure is not limited thereto and any number of preferences may be included for any user in the table 800.

FIG. 8 also includes a table 810, where for each user preference in the table 800, a corresponding question is included in table 810. These questions can be modified by the navigation controller 710 and/or an operator via the GUI 720 such that in order for user to select a preference, the corresponding question is provided to the user on his or her device as a prompt and the selection is made based on the response provided by the user via his or her device.

Figure 9:
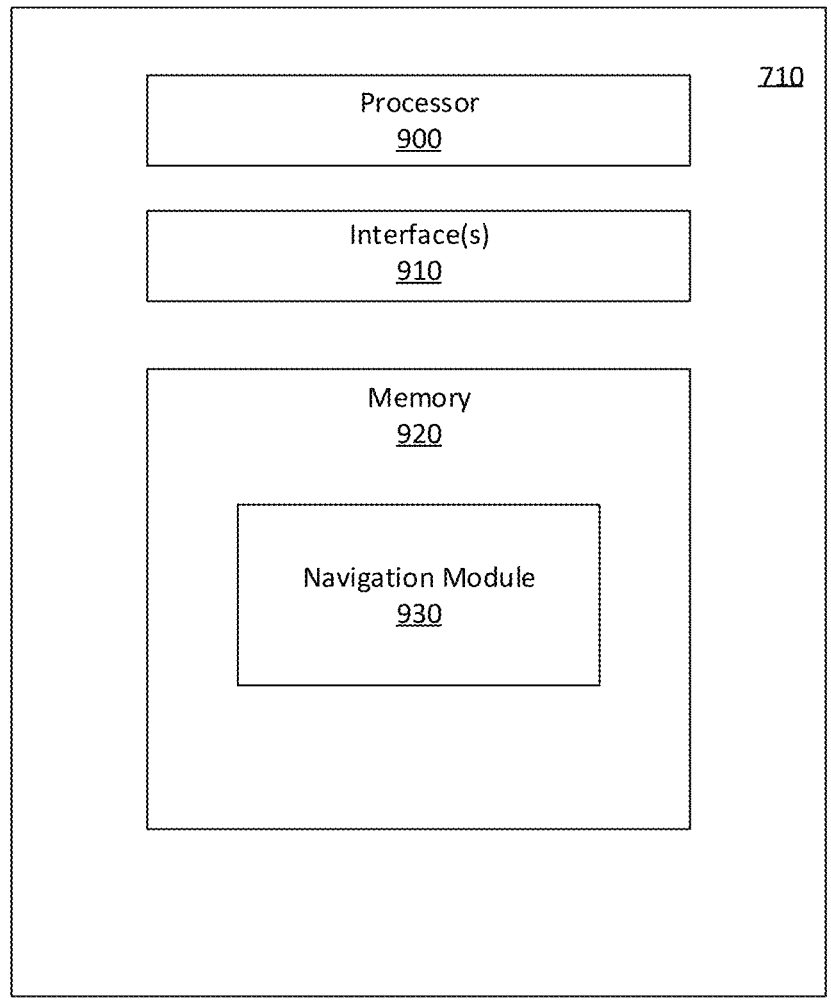
FIG. 9 is a block diagram showing different components of the navigation controller of FIG. 7.

FIG. 9 is a block diagram showing different components of the navigation controller of FIG. 7.

The navigation controller 710 can comprise one or more processors such as a processor 900, interface(s) 910 and one or more memories such as a memory 920. The processor 900 may execute an algorithm stored in the memory 920 for providing one or more navigation routes to a requesting party by taking into account per-intersection traffic conditions. The processor 900 may also be configured to decode and execute any instructions received from one or more other electronic devices or server(s). The processor 900 may include one or more general purpose processors (e.g., INTEL® or Advanced Micro Devices® (AMD) microprocessors, ARM) and/or one or more special purpose processors (e.g., digital signal processors, Xilinx® System On Chip (SOC) Field Programmable Gate Array (FPGA) processor, and/or Graphics Processing Units (GPUs)). The processor 900 may be configured to execute one or more computer-readable program instructions, such as program instructions to carry out any of the functions described in this description.

The interface(s) 910 may assist an operator in interacting with the navigation controller 710. The interface(s) 910 of the navigation controller 710 can be used instead of or in addition to the GUI 720 described above with reference to FIG. 7. In another example, the interface(s) 910 can be the same as the GUI 720. The interface(s) 910 either accept an input from the operator or provide an output to the operator, or may perform both the actions. The interface(s) 910 may either be a Command Line Interface (CLI), Graphical User Interface (GUI), voice interface, and/or any other user interface known in the art or to be developed.

The memory 920 may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

The memory 920 may include computer-readable instructions, which when executed by the processor 900 cause the navigation controller 710 to perform navigational route optimization by taking into account per-intersection traffic conditions. The computer-readable instructions stored in the memory 920 can be identified as navigation module (service) 930, the functionalities of which, when executed by the processor 900, will be further described below.

Figure 10:
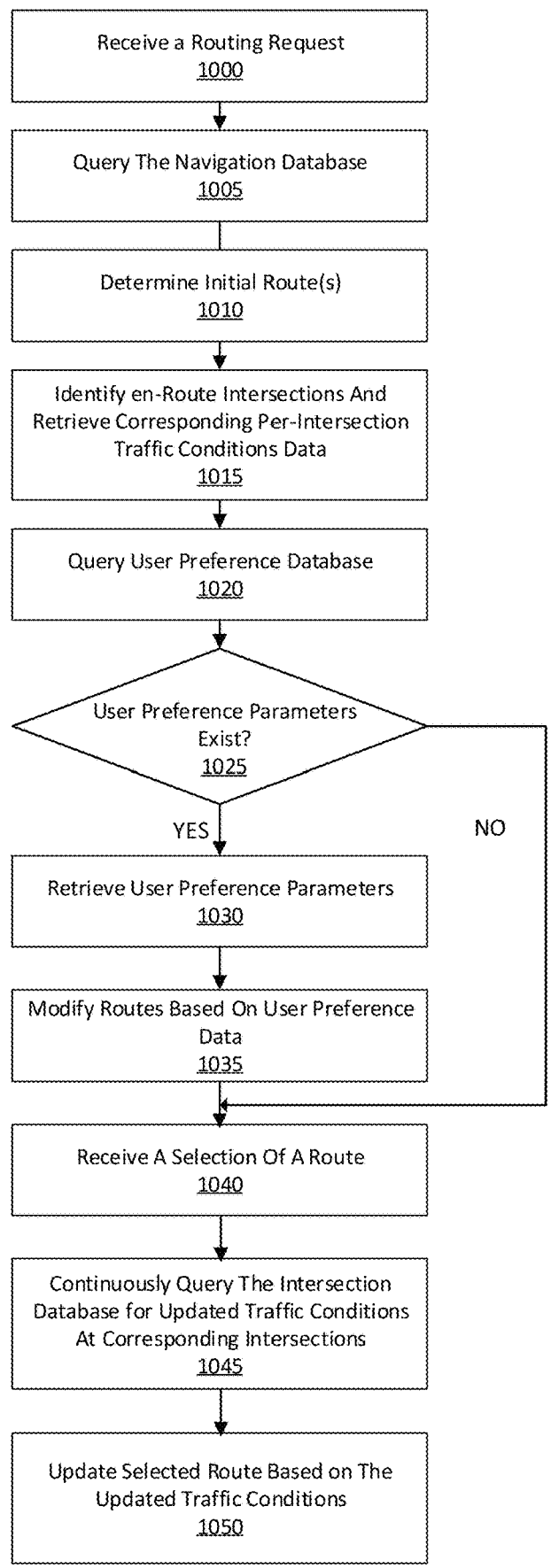
FIG. 10 describes a navigation optimization method based on per-zone traffic conditions.

FIG. 10 describes a navigation optimization method based on per-zone traffic conditions. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed example embodiments.

Furthermore, FIG. 10 will be described from the perspective of the navigation controller 710. However, it will be understood that the functionalities of the navigation controller 710 are implemented by the processor 900 executing computer-readable instructions corresponding to the navigation module 940 stored on the memory 920 described with reference to FIG. 9.

At step 1000, the navigation controller 710 may receive a request for possible routes to a destination. This request may be received via a device associated with a user such a mobile device, a smart phone, a laptop, a tablet, a desktop computer, an autonomous vehicle, etc. As part of the request, the navigation controller 710 may also receive information indicative of a current location and or an origin (start point) for the route(s) to the destination.

At step 1005, the navigation controller 710 may query the navigation database 740 for data to determine one or more routes to the destination. For example, the navigation controller 710 may query the navigation database 740 to obtain information on road traffic, road conditions, average traffic on routes during the current time period (or a time period over which the request for routing is received), etc.

At step 1010, the navigation controller 710 may determine one or more initial routes to the destinations based on the destination, the start point and the navigation data, according to any known or to be developed method.

At step 1015, the navigation controller 710 may identify one or more intersections along the one or more routes determines at step 1010. At Step 1015, the navigation controller 710 can also retrieve per-intersection traffic conditions data for each identified intersection from the intersection database 108.

At step 1020, the navigation controller 710 may query the user preference database 750 for obtaining user's navigation preferences (user preference parameters). At step 1025, the navigation controller 710 determines if table 800 in the navigation database 750 has user preference parameters stored for the user from whom the request at step 1000 is received.

If the answer to step 1025 is no, the process proceeds to step 1040, which will be described below.

If the answer to step 1025 is yes, then at step 1030, the navigation controller 710 may retrieve the user preference parameters from the navigation database 750.

Thereafter, at step 1035, the navigation controller 710, may modify the one or more initial routes to exclude ones that do not comply with the user preference parameters. For example, the user preference parameters may indicate that routes at which pedestrian counts are higher than a threshold (which is a configurable parameter) are to be avoided. Therefore, the navigation controller 710 avoids routes or routes that include one or more intersections at which the pedestrian count is higher than such threshold.

At step 1040, the navigation controller 710 may receive a selection of a route to the destination (either a modified route of step 1035 or one of the initial routes of step 1010 if no user preference parameters exist).

Thereafter, at step 1045, the navigation controller 710 may continuously query the intersection database 108 for updated traffic conditions data at one or more intersections along the route selected at step 1040. This querying may be performed periodically, where the corresponding periodicity is a configurable parameter determined based on experiments and/or empirical studies.

At step 1050, the navigation controller 710 may update the route (e.g., modify) based on updated traffic conditions data at each of the intersection(s) along the selected route. For example, the intersection 101 may be along the selected route. As the user's vehicle approaches the intersection 101, the traffic conditions data of the intersection 101 (available and recently updated in the intersection database 108) may indicate that a left turn signal (the same left turn signal that the user is to make along the route to his or her destination) at the intersection 101 has is currently having a wait time (behind the corresponding red light) of 3 minutes, which may be more than what the user preference parameters indicate. Accordingly, the navigation controller 710 may update the route such that either the user's vehicle is to avoid the intersection 101 completely or can avoid the said left turn signal.

Steps 1045 and 1050 may be repeated for each intersection along the updated route until an indication is received (or the navigation controller 710 automatically determines) that the user has arrived at the intersection.

By applying the method of claim 10, navigation routes provided by the navigation controller 710 to a user is optimized and more accurately determined because real-time and up-to-date traffic conditions data (which otherwise is not available in the navigation database 740 and thus not available to the navigation controller 710) is provided to the navigation controller 710 and is taken into consideration to determine the fastest route to the destination conditions on any available user preference.

Example embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, optical disks, compact disc read-only memories (CD-ROMs), and magneto-optical disks, semiconductor memories, such as ROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method of providing navigation guidance, the method comprising:
    identifying at least one intersection along at least one initial route to a destination;
    modifying the at least one initial route based on user preferences and traffic conditions data associated with the at least one intersection to yield at least one modified route, wherein:
        the user preferences comprise pedestrian count; and
        the traffic conditions data comprises data captured by a traffic sensor positioned at the at least one intersection;
    receiving a selection of a route from among the at least one modified route;
    receiving updated traffic conditions data for at least one corresponding intersection along the route selected including real-time pedestrian count; and
    modifying the route selected, based on the updated traffic conditions data and user preferences that comprise pedestrian count,
        wherein modifying the at least one initial route includes excluding at least one route upon determining that corresponding traffic conditions data for at least one intersection along the at least one route does not match one of the user preferences, and
        wherein the traffic conditions data and the updated traffic conditions data include a per-zone pedestrian count for the corresponding intersection.

2. The method of claim 1, further comprising:
    receiving a request for a route to the destination; and
    determining the at least one initial route based on the request.

3. The method of claim 2, wherein determining the at least one initial route is based on data retrieved from a navigation database and the user preferences.

4. The method of claim 1, wherein modifying the at least one initial route includes excluding at least one route upon determining that corresponding traffic conditions data for at least one intersection along the at least one route does not match one of the user preferences.

5. The method of claim 1, wherein modifying the route selected comprises: modifying the route selected prior to arrival of an object at the at least one corresponding intersection.

6. The method of claim 1, wherein the traffic conditions data and the updated traffic conditions data include at least one of an average traffic flow rate at a corresponding intersection, a per-zone traffic flow rate at the corresponding intersection, an average pedestrian count for the corresponding intersection, and a current per-zone traffic signal duration at the corresponding intersection.

7. The method of claim 1, wherein the updated traffic conditions data is received periodically after the route is selected.

8. A device configured to provide navigation guidance, the device comprising:
    memory having computer-readable instructions stored therein; and
    one or more processors configured to execute the computer-readable instructions to:
        identify at least one intersection along at least one initial route to a destination;

modify the at least one initial route based on user preferences and traffic conditions data associated with the at least one intersection to yield at least one modified route, wherein:
    the user preferences comprise pedestrian count; and
    the traffic conditions data comprises data captured by a traffic sensor positioned at the at least one intersection;
receive a selection of a route from among the at least one modified route;
receive updated traffic conditions data for at least one corresponding intersection along the route selected including real-time pedestrian count; and
modify the route selected based on the updated traffic conditions data and user preferences that comprise pedestrian count,
    wherein modification of the at least one initial route includes excluding at least one route upon determining that corresponding traffic conditions data for at least one intersection along the at least one route does not match one of the user preferences, and
    wherein the traffic conditions data and the updated traffic conditions data include a per-zone pedestrian count for the corresponding intersection.

9. The device of claim 8, wherein the one or more processors are configured to execute the computer-readable instructions to: receive a request for a route to the destination; and
determine the at least one initial route based on the request.

10. The device of claim 9, wherein the one or more processors are configured to execute the computer-readable instructions to determine the at least one initial route is based on data retrieved from a navigation database and the user preferences.

11. The device of claim 8, wherein the one or more processors are configured to execute the computer-readable instructions to modify the route selected prior to arrival of an object at the at least one corresponding intersection.

12. The device of claim 8, wherein the traffic conditions data and the updated traffic conditions data include at least one of an average traffic flow rate at a corresponding intersection, a per-zone traffic flow rate at the corresponding intersection, an average pedestrian count for the corresponding intersection, and a current per-zone traffic signal duration at the corresponding intersection.

13. The device of claim 8, wherein the updated traffic conditions data is received periodically after the route is selected.

14. One or more computer-readable medium having computer-readable instructions stored therein, which when executed by one or more processors, cause the one or more processors to:
    identify at least one intersection along at least one initial route to a destination;
    modify the at least one initial route based on user preferences and traffic conditions data associated with the at least one intersection to yield at least one modified route, wherein:
        the user preferences comprise pedestrian count; and
        the traffic conditions data comprises data captured by a traffic sensor positioned at the at least one intersection;
    receive a selection of a route from among the at least one modified route;
    receive updated traffic conditions data for at least one corresponding intersection along the route selected including real-time pedestrian count; and
    modify the route selected based on the updated traffic conditions data and user preferences that comprise pedestrian count,
        wherein modification of the at least one initial route includes excluding at least one route upon determining that corresponding traffic conditions data for at least one intersection along the at least one route does not match one of the user preferences, and
        wherein the traffic conditions data and the updated traffic conditions data include a per-zone pedestrian count for the corresponding intersection.

15. The one or more computer-readable medium of claim 14, wherein the execution of the computer-readable instructions cause the one or more processors to: receive a request for a route to the destination; and determine the at least one initial route based on the request.

16. The one or more computer-readable medium of claim 15, wherein the execution of the computer-readable instructions cause the one or more processors to determine the at least one initial route is based on data retrieved from a navigation database and the user preferences.

17. The one or more computer-readable medium of claim 14, wherein the execution of the computer-readable instructions cause the one or more processors to modify the route selected prior to arrival of an object at the at least one corresponding intersection.

18. The one or more computer-readable medium of claim 14, wherein the traffic conditions data and the updated traffic conditions data include at least one of an average traffic flow rate at a corresponding intersection, a per-zone traffic flow rate at the corresponding intersection, an average pedestrian count for the corresponding intersection, and a current per-zone traffic signal duration at the corresponding intersection.

19. The method of claim 1, wherein the at least one modified route comprises a plurality of modified routes, the method further comprising scoring the plurality of modified routes based on a number of matched user preferences that each of the plurality of modified routes includes.

* * * * *